United States Patent
Divatia et al.

(10) Patent No.: US 11,424,909 B1
(45) Date of Patent: Aug. 23, 2022

(54) SYSTEM AND METHOD FOR PROTECTING DATA THAT IS EXPORTED TO AN EXTERNAL ENTITY

(71) Applicant: BAFFLE INC., Santa Clara, CA (US)

(72) Inventors: Ameesh Divatia, Santa Clara, CA (US); Harold Byun, Santa Clara, CA (US)

(73) Assignee: BAFFLE, INC., Santa Clara, CA (US)

( * ) Notice: Subject to any disclaimer, the term of this patent is extended or adjusted under 35 U.S.C. 154(b) by 91 days.

(21) Appl. No.: 16/709,881

(22) Filed: Dec. 10, 2019

Related U.S. Application Data

(60) Provisional application No. 62/778,799, filed on Dec. 12, 2018.

(51) Int. Cl.
*H04L 9/06* (2006.01)
*H04L 9/08* (2006.01)
*H04L 29/06* (2006.01)
*H04L 9/00* (2022.01)
*H04L 9/40* (2022.01)
*G06F 21/62* (2013.01)

(52) U.S. Cl.
CPC ............ *H04L 9/008* (2013.01); *H04L 9/0631* (2013.01); *H04L 63/0428* (2013.01)

(58) Field of Classification Search
CPC ... H04L 9/008; H04L 63/0428; H04L 9/0631; H04L 9/0656; H04L 9/0681; G06F 21/602
See application file for complete search history.

(56) References Cited

U.S. PATENT DOCUMENTS

| | | | |
|---|---|---|---|
| 7,280,663 B1 | 10/2007 | Golomb et al. | |
| 8,281,151 B2 * | 10/2012 | Shah | H04L 9/3242 713/187 |
| 8,539,220 B2 * | 9/2013 | Raykova | H04L 63/0428 380/278 |
| 8,767,963 B2 | 7/2014 | Huang | |
| 8,811,608 B2 | 8/2014 | Sella et al. | |
| 9,521,124 B2 * | 12/2016 | Raykova | H04L 63/0428 |
| 10,289,816 B1 * | 5/2019 | Malassenet | G06F 9/30036 |
| 10,630,478 B1 | 4/2020 | Yavuz | |
| 2003/0191950 A1 | 10/2003 | Patel et al. | |
| 2011/0040820 A1 | 2/2011 | Rane et al. | |
| 2011/0211692 A1 | 9/2011 | Raykova et al. | |
| 2012/0002811 A1 | 1/2012 | Smart | |

(Continued)

FOREIGN PATENT DOCUMENTS

WO    WO2009115824 A1    9/2009

OTHER PUBLICATIONS

"Simple Encrypted Arithmetic Library—Seal v2.2"—Chen et al, Microsoft Research USA, Royal Holloway, University of London, UK, Jun. 2017 https://www.microsoft.com/en-us/research/wp-content/uploads/2017/06/sealmanual_v2.2.pdf (Year: 2017).*

(Continued)

*Primary Examiner* — Ran A Scott

(74) *Attorney, Agent, or Firm* — DLA Piper, LLP US

(57) ABSTRACT

A system and method secures data including sensitive data parts for exporting and securely analyzes the secure exported data. In one embodiment, the secure data may be analyzed using at least two compute elements. In one embodiment, the system may use the AES process to secure the sensitive parts of the data.

15 Claims, 2 Drawing Sheets

(56) References Cited

U.S. PATENT DOCUMENTS

| | | | |
|---|---|---|---|
| 2012/0159194 A1 | 6/2012 | Anderson | |
| 2016/0050070 A1 | 2/2016 | Bohli et al. | |
| 2017/0163424 A1 | 6/2017 | Kafai et al. | |
| 2017/0201498 A1* | 7/2017 | Baig | H04L 63/0428 |
| 2018/0091306 A1 | 3/2018 | Antonopoulos et al. | |
| 2018/0114028 A1 | 4/2018 | Kafai et al. | |
| 2018/0212971 A1 | 7/2018 | Costa | |
| 2018/0349867 A1 | 12/2018 | Trieflinger | |
| 2018/0357427 A1 | 12/2018 | Lindell et al. | |
| 2018/0365290 A1 | 12/2018 | Kaushik et al. | |
| 2019/0228469 A1 | 7/2019 | Yu et al. | |
| 2019/0286837 A1 | 9/2019 | Yim et al. | |
| 2019/0356468 A1 | 11/2019 | Zeh et al. | |
| 2020/0034550 A1 | 1/2020 | Kim et al. | |
| 2020/0134204 A1 | 4/2020 | Furukawa et al. | |
| 2020/0228325 A1 | 7/2020 | Fan et al. | |
| 2020/0228340 A1 | 7/2020 | Blackhurst et al. | |
| 2020/0259651 A1 | 8/2020 | Mohassel et al. | |
| 2020/0267144 A1 | 8/2020 | Wagner et al. | |
| 2020/0351078 A1 | 11/2020 | Kolte et al. | |
| 2020/0366462 A1 | 11/2020 | Kolte et al. | |
| 2021/0002811 A1 | 1/2021 | Bellinger et al. | |
| 2021/0167946 A1 | 6/2021 | Bitan et al. | |

OTHER PUBLICATIONS

"Comparative Evaluation of Elliptic Curve Cryptography Based Homomorphic Encryption Schemes for a Novel Secure Multiparty Computation"—Patel et al, Journal of Information Security, vol. 5, No. 1, Jan. 2014 http://citeseerx.ist.psu.edu/viewdoc/summary?doi=10.1.1.642.1871 (Year: 2014).*

Intel SGX is at https://software.intel.com/en-us/sgx, printed Oct. 1, 2019.

Microsoft SEAL is at https://www.microsoft.com/en-us/research/project/microsoft-seal/, printed Oct. 1, 2019.

Cybernetica is at https://sharemind.cyber.ee/, printed Oct. 1, 2019.

Costan, Victor et al., entitled, "Intel SGX Explained," Computer Science and Artificial Intelligence Laboratory, Massachusetts Institute of Technology, 2016, 118 pp., https://eprint.iacr.org/2016/086.pdf.

Chen, Hao et al., entitled, "Simple Encrypted Arithmetic Library—SEAL v2.2," Microsoft Research, Royal Holloway, University of London, 33 pp., https://www.microsoft.com/en-us/research/wp-content/uploads/2017/06/sealmanual_v2.2.pdf.

Bogdanov, Dan et al., entitled, "Sharemind:aframeworkforfastprivacy-preserving computations," Univeristy Tartu, AS Cybernetica, 23pp., https://eprint.iacr.org/2008/289.pdf.

Bellare, Mihir, entitled, "Encryption Translation: How to Inherit Standard Compliance," UCSD, Baffle, Inc. (Dec. 18, 2018), 27 pp.

Chenette, Nathan et al., entitled, "Practical Order-Revealing Encryption with Limited Leakage," Rose-Hulman Institute of Technology, Stanford University, Facebook, Inc., 27 pp.

Patel et al., "Comparative evaluation of elliptic curve cryptography based homomorphic encryption schemes for a novel secure multi-party computation." Journal of Information Security 2014 (2014). (Year: 2014), 7 pages.

* cited by examiner

SYSTEM AND METHOD FOR PROTECTING DATA THAT IS EXPORTED TO AN EXTERNAL ENTITY

RELATED CASES/PRIORITY CLAIMS

The application claims the benefit under 35 USC 119(e) to U.S. Provisional Patent Application Ser. No. 62/778,799, filed Dec. 12, 2018, the entirety of which is incorporated herein by reference.

FIELD

The disclosure relates generally to information technology and security and specifically to a technique for protecting data that is being exported to an external entity outside of the data owner's control for the purpose of analyzing that data.

BACKGROUND

Data is the ultimate asset that enterprises or individuals own. In order to extract value from data, it becomes necessary to export data to a third party so that the data can be analyzed. When data is exported, it is no longer in control of the data owner and thus can be compromised. For example, if the data is communicated over an unsecure communications channel, a third party may intercept the data. The consequences of compromised data are undesirable and may include identity, financial, reputation or emotional loss.

Data loss prevention is a commonly used term to describe a class of products that monitor the export of sensitive data. Legacy products that are used for on premise data loss protection include products sold by Symantec, McAfee, Digital Guardian, Forcepoint, etc. Cloud Access Security Broker (CASB) products from Ciphercloud, Netskope, Skyhigh (McAfee), etc. also provide this capability in the cloud environment. All of these existing and known solutions rely on 'observation' of data movement to flag sensitive data being exfiltrated (defined as data that is exported to an environment where it can be used for malicious purposes).

Products, like the above conventional ones, that rely on the observation of data movement have limitations. For example, products that rely on observation will identify a data exfiltration scenario usually after the data has already been transferred instead of preventing it from being transferred in the first place which does not address the problem of preventing the compromise of the data. Thus, these prior solutions do not change the actual data record and are restricted to reading the data that is exported and detecting if it is sensitive data based on established rules.

Some existing products have been enhanced to improve upon this behavior by blocking sensitive data from being transferred, but inadvertent blocking prevents the ability to export that data for legitimate purposes such as analytics. Thus, it is desirable to provide a system and method that protects that exported data while overcoming the above limitations and problems of the known methods and it is to this end that the disclosure is directed.

DETAILED DESCRIPTION OF ONE OR MORE EMBODIMENTS

Figure 1:
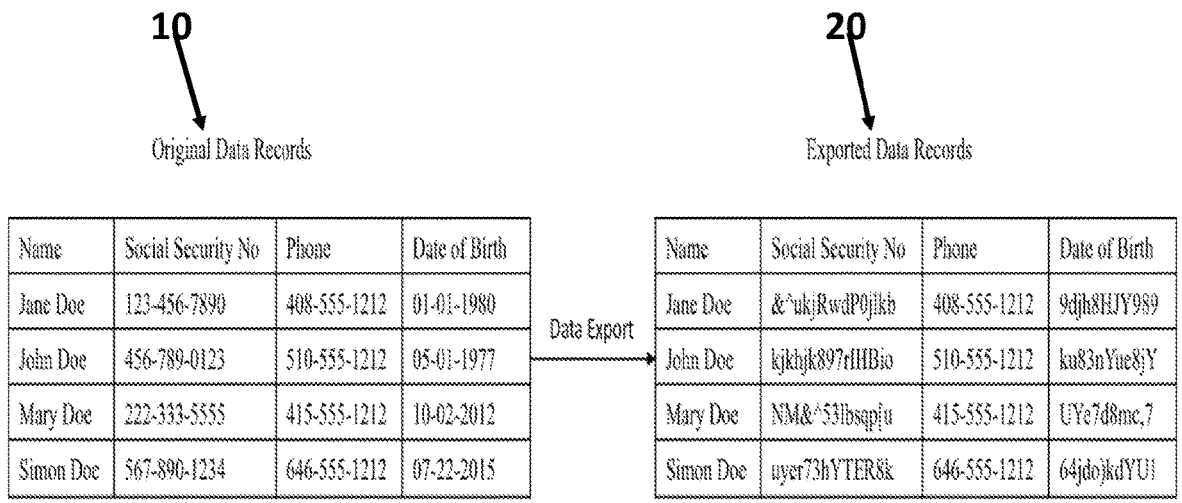
FIG. 1 illustrates an example of a set of original data records and a set of encrypted exported data records.

The disclosure is particularly applicable to a data protection system and method that uses well known Advanced Encryption Standard (AES) encryption for data records and it is in this context that the disclosure will be described. It will be appreciated, however, that the system and method has greater utility since the system may be implemented using any known or yet to be encryption system or standard. Furthermore, the system may be used with any type of data that can be encrypted and is not in any way limited to the exemplary data records in a database shown in the drawings. The solution protects from data loss by transforming the data into an unusable form using encryption before exporting that data, while continuing to preserve the utility of that data. The disclosed system and method are a technical solution to the above problems with known system and this disclosed technical solution is not well understood, not routine and not conventional in the information technology industry.

FIG. 1 illustrates an example of a set of original data records 10 and a set of encrypted exported data records 20 that may be generated by the disclosed system and method. It is noted that the disclosed system and method may also be used with any other type of data and is not limited to data records as shown in FIG. 1 and is also not limited to data records in which only certain columns of the data record are encrypted. Each original data record may include a name field/column, a social security number field/column, a phone field/column and a date of birth field/column. In the example shown in FIG. 1, two columns (Social Security Number and Date of Birth) are considered sensitive and two columns (Name and Phone) are not sensitive. As a result, the set of exported data records 20 have the social security numbers and the data of birth data encrypted. The disclosed system and method does not attempt to detect an exfiltration scenario or to block exfiltration and instead it simply encrypts sensitive data (as shown in FIG. 1) using a secret key during the export operation so that the exported data does not reveal the sensitive information.

In the system and method disclosed below, the secret key may be communicated using some out-of-band method (not over the insecure export channel) from the data protector to the data analyzer. The key can be sent using a private email from a human at the data protector to a human who installs it in the data analyzer. Or it can be shared programmatically by providing shared access to a key manager (such as AWS KMS) to both the data protector and data analyzer.

Figure 2:
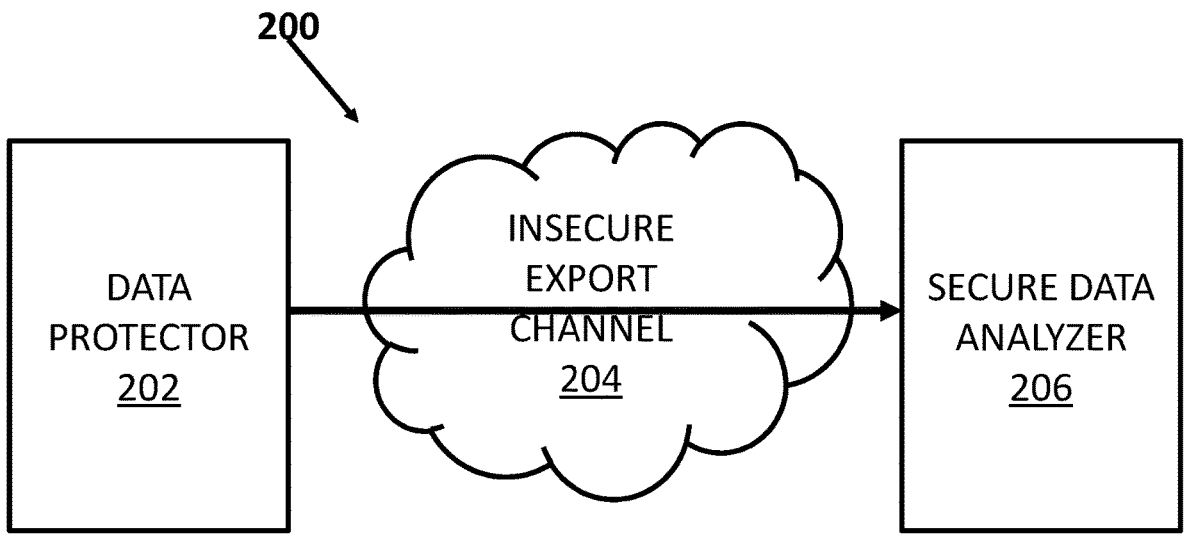
FIG. 2 illustrates an embodiment of a system for securely exporting and analyzing data.

FIG. 2 illustrates an embodiment of a system 200 for securely exporting and analyzing data. The system 200 may have a data protector 202 that secures any sensitive parts of the data (shown in more detail in FIG. 3) so that data is secured with the sensitive part of the data secured so that the sensitive part of the data is not readable by a third party. The secured data may be exported over an insecure export channel 204. A secure data analyzer 206 may receive the secure data and be able to analyze it despite the secured data (shown in more detail in FIG. 4). In this manner, the security of the sensitive parts of the data are maintained during export and during the analysis of the data. The data protector 202 and the secure data analyzer 206 may each be implemented in hardware, software or a combination of hardware and software. For example, when one or both of the data protector 202 and/or the secure data analyzer 206 are implemented in hardware, that element is a known or yet to be developed hardware device that is capable of performing the processes described in more detail with reference to FIG. 3 or 4 and may be, for example, a microprocessor, microcontroller, a digital signal processor, an ASIC, etc. Alternatively, each of the elements 202, 206 may be a computer system that has a processor and performs the operations. When one or both of the data protector 202 and/or the secure data analyzer 206 are implemented in software or a hardware, that element may be a processor (such as in a computer system) that executes a plurality of lines of computer code so that the processor is configured to perform the processes described in more detail with reference to FIG. 3 or 4. While the hardware on which either the data protector 202 and/or the secure data analyzer 206 is implemented is known and well understood, the process of securing and exporting data and the process of analyzing secure data are not well understood, not routine and not conventional in the information technology industry since that industry instead attempts to detect and stop the nefarious activity with limited success as described above.

Figure 3:
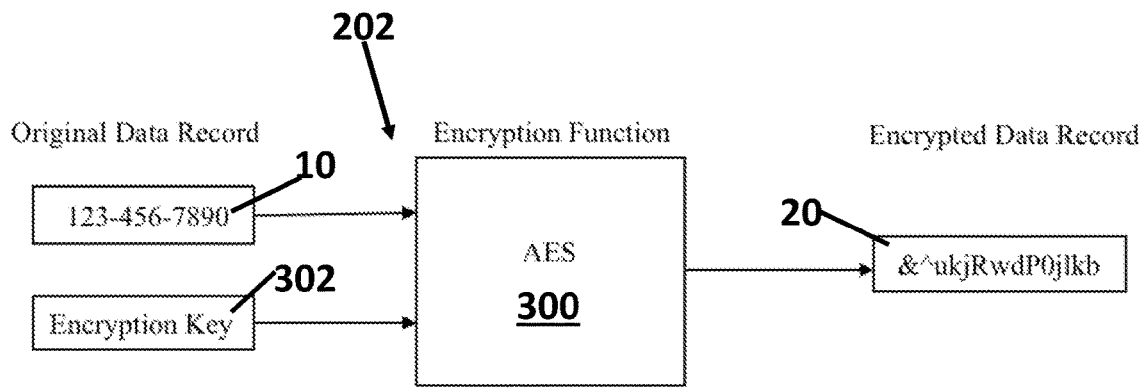
FIG. 3 illustrates an example of a system that may be used to encrypt the data records that are output as the set of encrypted data records.
Figure 4:
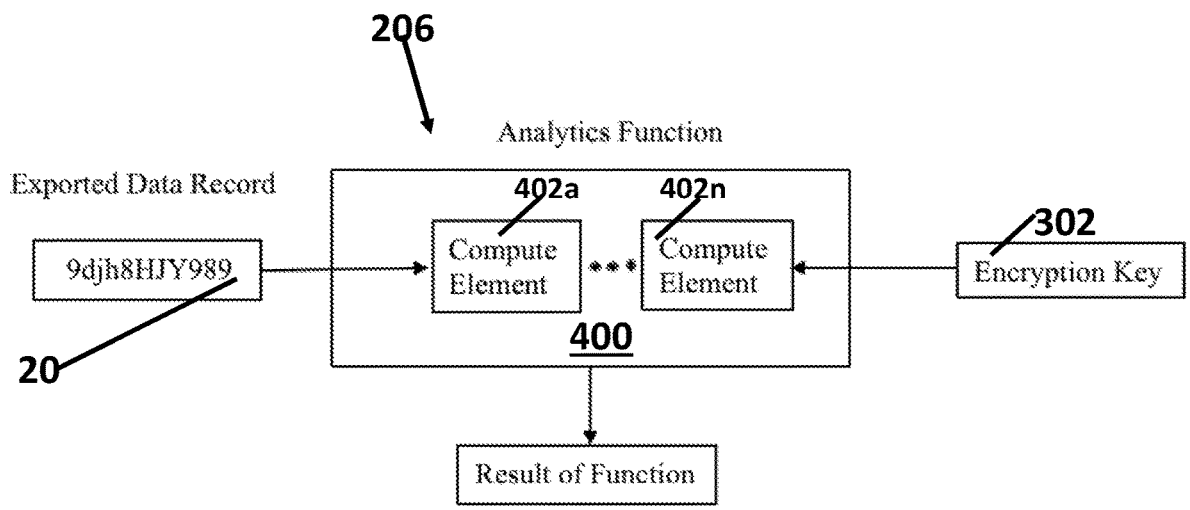
FIG. 4 illustrates an example of a system that may be used to securely analyze exported data.

FIG. 3 illustrates an example of the data protector 202 that may be used to encrypt the data records 10 that are output as the set of encrypted data records 20. As shown the data protector 202 may have an encryptor 300, that may be implemented in hardware or software, that may be used to secure the original data 10. The encryptor 300 may perform a known encryption function. In one embodiment, the encryptor 300 may use the known AES encryption function to performing the securing of the data. When encryption is being used to secure the data (or portions of the data as described above), a known encryption key 302 may be input to the encryptor 300 so that the encrypted data record 20 is generated. Alternatively, other known or yet to be developed techniques for securing the data may be used. While encryption/securing data using a technique is known in the industry, the encryption/securing of one or more sensitive part of the data (but less than all of the data) is not well known, conventional or routine in the information technology industry FIG. 4 illustrates an example of the secure data analyzer 206 that may be used to securely analyze exported data. In this embodiment, the secure data analyzer 206 may include an analyzer 400 that can perform an analysis function on the exported data. In more detail, the secure data analyzer 400 may include one or more (at least two) compute elements $402a, \ldots, 402n$ that perform the analysis of the secure data. Each compute element may be a processor, two or more processors, a processor with memory, etc. As shown in FIG. 4, the data that is exported 20 can be analyzed by the set of compute elements 402 in which, at no point, the exported data record 20 (encrypted pieces of data) and the encryption key 302 are provided to the same compute element. The two compute elements may then cooperatively execute a secure multi-party computation (SMPC) protocol that is known and described in co-pending U.S. patent application Ser. Nos. 16/401,085 and 16/412,174 filed May 1, 2019 and May 14, 2019 which are incorporated herein by reference. Using the SMPC protocol, the two compute elements produce an encrypted result of the analysis while ensuring the privacy of the data at each individual compute element since the data does not need to be decrypted. However, the encrypted result output of the SMPC protocol can be decrypted using the encryption key to reveal the plain answer of the analysis if such a plain answer is needed, otherwise the encrypted result can be stored for later use in other SMPC protocols. In other embodiments, other techniques including fully homomorphic encryption or using trusted execution environment hardware, such as Intel SGX enclaves, could also be used to analyze the encrypted data.

Two examples of the analysis that can be performed on the data may include a filter operation and an average operation. For example, using the previous example of personal records, the analysis could filter for all records with birth-date less than a specified date using a SQL query such as SELECT * FROM people WHERE birthdate <"2000-01-01". The SMPC protocol for less than comparison performs the filter for <without decrypting birthdate or decrypting the literal "2000-01-01". As a second example, the analysis could compute the average age of all the people using a SQL query such as SELECT AVG(NOW( )—birthdate) FROM people. The SMPC protocols for subtraction, addition, and average perform the calculation without decrypting the birthdates of people.

In summary, the disclosed system and method does not attempt to detect an exfiltration scenario or to block exfiltration. Instead, it simply secures (encrypts in one embodiment) sensitive data within the data using a secret key during the export operation so that the exported data does not reveal the sensitive information. In contrast to the conventional systems described above, the disclosed system and method changes the data record by passing it through a transformation function, such as based on the AES encryption standard (//en.wikipedia.org/wiki/Advanced_Encryption_Standard). In addition, the disclosed system and method can choose a part of a data record (for example, a social security number or a data of birth) and encrypt it at that granularity that is not found in conventional systems and thus is a technical solution to the technical problem of information security and is not well understood, not routine and not conventional in the information security industry.

Unlike conventional systems in an enterprise environment in which encryption is introduced as data is digested into data stores, the disclosed system and method involves encrypting data as it leaves the enterprise environment and the ability to process the exported encrypted record.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system, comprising:
a computer with a computer processor and computer memory, the computer in communication with an insecure channel configured to allow transport of data exchanged between the computer and a secure data analyzer computer;
the computer configured to encrypt a plurality of data using an encryption key,
the computer configured to send the plurality of encrypted data and the encryption key over the insecure channel;
a first secure data analyzer computer with a first processor and a first memory and a second secure data analyzer computer with a second processor and a second memory wherein the first secure data analyzer computer configured to receive the encrypted data and the second secure data analyzer computer configured to receive the encryption key and wherein the first secure data analyzer computer and the second secure data analyzer computer are configured use a secure multiple party computation protocol to perform an operation on the encrypted data to generate an encrypted result without decrypting the received data and while keeping the encryption key and the received encrypted data isolated from one another and ensuring privacy of the received encrypted data that are not decrypted during the operation.

2. The system of claim 1, wherein the data protector encrypts the plurality of pieces of data using an advanced encryption standard process.

3. The system of claim 2, wherein the data further comprises one or more sensitive pieces of data and one or more not sensitive pieces of data and wherein the data protector encrypts the one or more sensitive pieces of data.

4. The system of claim 3, wherein the data protector encrypts the one or more sensitive pieces of data using an advanced encryption standard process.

5. The system of claim 1, wherein the first and second compute elements perform the operation of the encrypted plurality of pieces of data using one of a secure multi-party computation protocol, fully homomorphic encryption and trusted execution environment hardware.

6. An apparatus for protecting exported data communicated over an insecure channel, comprising:
a secure data analyzer computer having a processor having a first compute element and a second compute element wherein each compute element has a processor and memory;
the first compute element is configured to receive encrypted plurality of pieces of data over the insecure channel;
the second compute element is configured to receive an encryption key; and
wherein the first and second compute elements are configured to perform, using a secure multiple party computation protocol, a filter or export operation on the encrypted plurality of pieces of data and generate an encrypted analysis result while ensuring privacy of the plurality of pieces of data that are not decrypted during the operation while keeping the encryption key and the received encrypted data isolated from one another.

7. The apparatus of claim 6 further comprising a data protector having a processor connected to the secure data analyzer over an insecure channel, the data protector being configured to encrypt the plurality of pieces of data to be exchanged over the insecure channel.

8. The apparatus of claim 7, wherein the plurality of pieces of data further comprises one or more sensitive pieces of data and one or more not sensitive pieces of data and wherein the data protector encrypts the one or more sensitive pieces of data.

9. The apparatus of claim 8, wherein the data protector encrypts the one or more sensitive pieces of data using an advanced encryption standard process.

10. The apparatus of claim 6, wherein the first secure data analyzer computer and second secure data analyzer computer are configured to perform the operation of the encrypted plurality of pieces of data using one of a secure multi-party computation protocol, fully homomorphic encryption and trusted execution environment hardware.

11. A method for securely exporting data, the method comprising:
receiving a plurality of key encrypted data, by a secure data analyzer having a first compute elements and a second compute element wherein each first compute element and second compute element has its own processor and memory,
receiving at the first compute element the encrypted data;
receiving, at the second compute element, the key used to encrypt the received data; and
performing a filter or export operation on the received encrypted data using both the first and second compute elements by a secure multiple party computation protocol without decrypting the received encrypted data; and
generating an encrypted result from the first and second compute elements while ensuring privacy of the plurality data that are not decrypted during the operation while keeping the encryption key and the received encrypted data isolated from one another.

12. The method of claim 11 further comprising encrypting, using a data protector having a processor and memory in communication with the secure data analyzer over an insecure channel, the data to be exchanged over the insecure channel.

13. The method of claim 12, wherein the plurality of data further comprises one or more sensitive pieces of data and one or more not sensitive pieces of data and wherein encrypting the plurality of data further comprises encrypting, by the data protector, the one or more sensitive pieces of data.

14. The method of claim 13, wherein the data protector encrypts the one or more sensitive pieces of data using an advanced encryption standard process.

15. The method of claim 11, wherein performing the operation on the encrypted plurality of pieces of data further comprises perform the operation of the encrypted plurality of pieces of data using one of a secure multi-party computation protocol, fully homomorphic encryption and trusted execution environment hardware.

* * * * *